(12) United States Patent
Kim et al.

(10) Patent No.: US 8,149,512 B2
(45) Date of Patent: Apr. 3, 2012

(54) MICRO-SHUTTER DEVICE AND METHOD OF MANUFACTURING THE SAME

(75) Inventors: Woon-bae Kim, Suwon-si (KR); Kyu-dong Jung, Suwon-si (KR); Seung-wan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 12/557,118

(22) Filed: Sep. 10, 2009

(65) Prior Publication Data

US 2010/0118413 A1    May 13, 2010

(30) Foreign Application Priority Data

Nov. 10, 2008    (KR) .................. 10-2008-0111003

(51) Int. Cl.
*G02B 1/06* (2006.01)
*G02B 26/02* (2006.01)
*G02F 1/07* (2006.01)

(52) U.S. Cl. .................. 359/665; 359/230; 359/253

(58) Field of Classification Search .......... 359/665–667, 359/228, 230

See application file for complete search history.

(56) References Cited

U.S. PATENT DOCUMENTS

| | | | |
|---|---|---|---|
| 4,435,047 A | 3/1984 | Fergason | |
| 5,437,811 A | 8/1995 | Doane et al. | |
| 5,503,952 A | 4/1996 | Suzuki et al. | |
| 7,826,144 B2* | 11/2010 | Mescher | 359/665 |
| 2009/0021818 A1* | 1/2009 | Weir et al. | 359/224 |
| 2009/0244692 A1* | 10/2009 | Verstegen et al. | 359/315 |
| 2010/0208357 A1* | 8/2010 | Batchko et al. | 359/666 |
| 2010/0276493 A1* | 11/2010 | Havens et al. | 235/470 |

FOREIGN PATENT DOCUMENTS

| | | |
|---|---|---|
| JP | 2003-035896 A | 2/2003 |
| JP | 2007-047723 A | 2/2007 |
| KR | 10-2006-0121336 A | 11/2006 |

* cited by examiner

*Primary Examiner* — Jordan Schwartz
(74) *Attorney, Agent, or Firm* — Sughrue Mion, PLLC

(57) ABSTRACT

Micro-shutter device applicable to display devices including a flexible display device and method of manufacturing same are provided. Micro-shutter device includes membrane. Frame including receiving hole in its center portion is bonded to membrane. Transparent substrate is bonded to frame to encapsulate optical fluid received in receiving hole. Actuator varies refractive power produced by change in curvature of fluid lens formed in the center portion of the receiving hole due to bending of a periphery of the fluid lens. A reflector is disposed to correspond to the fluid lens and be spaced apart from the membrane, such that light intensity transferred to a user is adjusted depending on the refractive power produced by a change in curvature of the fluid lens. Therefore, the device has improved optical efficiency compared to using liquid crystal and a polarizing film, and can have a flexible structure for application to a flexible display device.

12 Claims, 5 Drawing Sheets

MICRO-SHUTTER DEVICE AND METHOD OF MANUFACTURING THE SAME

CROSS-REFERENCE TO RELATED APPLICATION

This application claims the benefit of Korean Patent Application No. 10-2008-111003, filed on Nov. 10, 2008, at the Korean Intellectual Property Office, the disclosure of which is incorporated herein in its entirety by reference.

BACKGROUND

1. Field

The following description relates to a micro-shutter device and a method of manufacturing the same, and more particularly, to a micro-shutter device applicable to various display devices including a flexible display device and a method of manufacturing the same.

2. Description of the Related Art

Liquid Crystal Displays (LCDs) have better visibility than cathode ray tube (CRT) displays, and are superior to CRT displays of the same display size in terms of average power consumption and heating value. Therefore, LCDs, as well as plasma display panels (PDPs) and field emission displays (FEDs), have attracted considerable attention as next-generation display devices for cellular phones, computer monitors, televisions, etc.

LCDs selectively transmit light emitted from a light source such as a backlight unit to be displayed on a screen. That is, when a voltage is applied to liquid crystal molecules, the orientation of the liquid crystal molecules is changed. The liquid crystal functions as an optical shutter that selectively transmits light using a change in orientation. However, it is impossible to block light using only liquid crystal, and thus polarizing films that transmit only light having a predetermined polarization direction are disposed on front and rear surfaces of the liquid crystal display panel.

While liquid crystal and a polarizing film are used to selectively transmit light in the LCD, the liquid crystal and the polarizing film cause optical loss, and thus only about 5 to 10% of light from the backlight is effectively transmitted. That is, in the LCD, optical loss of more than 50% is caused by the liquid crystal and the polarizing film, and thus optical efficiency is low.

Currently, in order to overcome the LCD's drawback of low optical efficiency, a shutter using a micro electro mechanical system (MEMS) is being developed to replace the liquid crystal and the polarizing film.

Meanwhile, since a conventional flat panel display device employs a glass substrate, it is fragile and cannot be deformed, and thus is poor in portability. In order to solve this problem, a flexible display is on the rise. Since the flexible display device is not fragile and may be bent or rolled, it can have a large screen and still be portable. Accordingly, a flexible display device that is applicable to a portable device is being developed.

SUMMARY

The following description relates to a micro-shutter device and a method of manufacturing the same that can increase optical efficiency by reducing optical loss and apply to a flexible display device.

According to an exemplary aspect, there is provided a micro-shutter device including a membrane, a frame, a transparent substrate, an actuator, and a reflector. The frame is bonded to the membrane and including a receiving hole in a center portion. The transparent substrate is bonded to the frame to encapsulate an optical fluid received in the receiving hole. The actuator varies refractive power produced by a change in curvature of a fluid lens formed in the center portion of the receiving hole due to bending of a periphery of the fluid lens. The reflector is spaced apart from the membrane such that light intensity transferred to a user is adjusted depending on the refractive power produced by a change in curvature of the fluid lens, and is disposed to correspond to the fluid lens.

According to an exemplary aspect, there is provided a method of manufacturing a micro-shutter device including preparing a frame having a receiving hole formed in its center, bonding a membrane to one surface of the frame, receiving an optical fluid in the receiving hole of the frame, bonding a transparent substrate to the other surface of the frame to encapsulate the optical fluid received in the receiving hole of the frame, attaching actuators that vary refractive power produced by a change in curvature of a fluid lens formed in the center portion of the receiving hole to a periphery of the fluid lens, and installing a reflector to be spaced apart from the membrane and to correspond to the fluid lens.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

Figure 1:
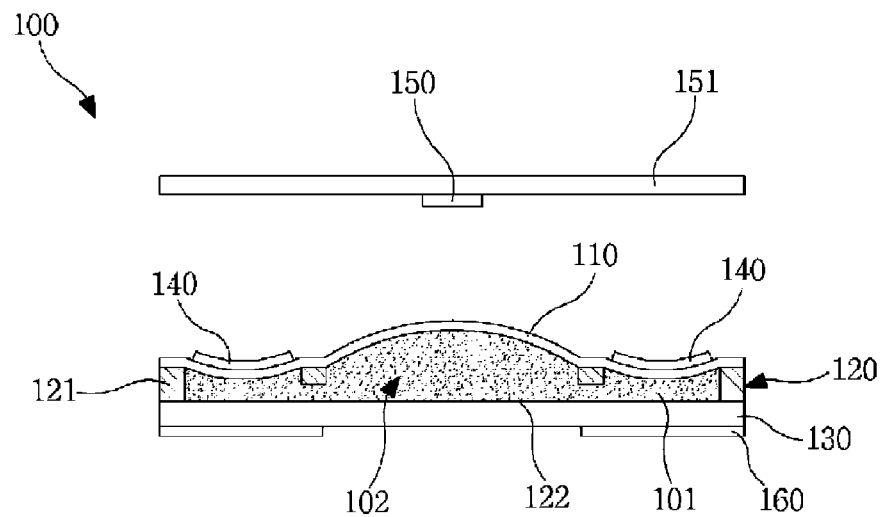
FIG. 1 is a cross-sectional view of a micro-shutter device according to an exemplary embodiment.

The general inventive concept is described more fully hereinafter with reference to the accompanying drawings, in which exemplary embodiments of the invention are shown. The general inventive concept may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a cross-sectional view of a micro-shutter device according to an exemplary embodiment. Referring to FIG. 1, the micro-shutter device includes a membrane 110, a frame 120, a substrate 130, actuators 140, and a reflector 150.

The membrane 110 is a flexible thin film, and its shape varies depending on movement of an optical fluid 101 in the frame 120. Accordingly, refractive power produced by a change in curvature of a fluid lens 102 (described below) may be changed.

Here, the optical fluid 101 may be formed of a material having a predetermined refractive index and viscosity, such as silicon. The optical fluid 101 may have various refractive indexes depending on its characteristics. Therefore, compared to a conventional lens having a uniform refractive index, the optical fluid may have a high refractive index.

Further, the membrane 110 is formed of a transparent material, which enables light through the fluid lens 102 to pass through the membrane. Moreover, the membrane 110 and the substrate 130 may encapsulate the optical fluid 101 in the frame 120.

The membrane 110 may be formed of a flexible and transparent material such as poly dimethyl siloxane (PDMS). When the frame 120 is formed in a rectangular shape, the membrane 110 may be formed of a rectangular thin film of corresponding size.

The membrane 110 is bonded to one surface of the frame 120. A receiving hole 122 is formed in the center of the frame 120 to receive the optical fluid 101. The frame 120 has a border 121 along edges of the receiving hole 122. The frame 120 may be formed of glass. When an opening in a unit pixel of a display device has a rectangular shape, the frame 120 may have a rectangular shape.

The substrate 130 is bonded to the other surface of the frame 120. That is, the substrate 130 is disposed opposite to the membrane 110 and bonded to the frame 120 which is interposed between the substrate 130 and the membrane 110. Accordingly, the substrate 130, together with the membrane 110, may encapsulate the optical fluid 101 in the receiving hole 122 of the frame 120. Here, when the frame 120 is formed in a rectangular shape, the substrate 130 may be formed in the shape of a rectangular plate of corresponding size.

In addition, the substrate 130 is formed of a transparent material, which enables light emitted from an external light source such as a backlight unit to pass through the substrate. The substrate 130 may be formed of glass.

The actuators 140 may vary refractive power produced by a change in curvature of the fluid lens 102 by bending peripheries of the fluid lens 102 formed in the center portion of the receiving hole 122. More specifically, the actuators 140 may concavely bend the periphery of the fluid lens 102 on the outside of the fluid lens 102 so that the optical fluid 101 in the frame 120 can move towards the center of the receiving hole 122.

Alternatively, the actuator 140 may convexly bend the periphery of the fluid lens 102 on the outside of the fluid lens 102 so that the optical fluid 101 in the frame 120 may move towards edges of the receiving hole 122.

Accordingly, the center portion of the receiving hole 122 may be formed in a convex, concave or flat shape. As a result, the refractive power produced by a change in curvature of the fluid lens 102 formed in the center portion of the receiving hole 122 may have a negative or positive value or be zero.

That is, the refractive power produced by a change in curvature of the fluid lens 102 may vary between negative and positive values. Meanwhile, the actuator 140 is formed of a flexible material like the frame 120 and the substrate 130 to enable the micro-shutter device 100 to be applicable to a flexible display device. That is, since the micro-shutter device 100 has a flexible structure, it may be applicable to a flexible display device that is not fragile and may be deformed, e.g., bent or rolled.

The reflector 150 is disposed outside the membrane 110 to be spaced apart from the membrane 110. Further, the reflector 150 is disposed to correspond to the fluid lens 102 formed in the center of the receiving hole 122. The reflector 150 may be formed on a transparent plate 151.

Here, when the refractive power produced by a change in curvature of the fluid lens 102 is set to a positive maximum value by the actuator 140, the reflector 150 is disposed to reflect all light focused through the fluid lens 102 so that the light is not transferred to a user at all.

Alternatively, when the refractive power produced by a change in curvature of the fluid lens 102 is set to a negative minimum value by the actuator 140, the reflector 150 is formed to have a size enabling light dispersed through the fluid lens 102 to maximally pass through a surrounding region and be transferred to the user.

Accordingly, the reflector 150 may adjust light intensity transferred to the user when the refractive power produced by a change in curvature of the fluid lens 102 varies between a positive maximum value and a negative minimum value. The light incident outside the substrate 130 may be collimated light such that the light intensity transferred to the user may be adjusted by the reflector 150.

Furthermore, a light shielding unit 160 may be formed on an outer surface of the substrate 130 to correspond to the periphery of the fluid lens 102 such that light is directed only towards the fluid lens 102. Here, the light shielding unit 160 is formed of an opaque material that cannot transmit light, and may be formed to cover a region other than the region corresponding to the fluid lens 102.

Figure 2:
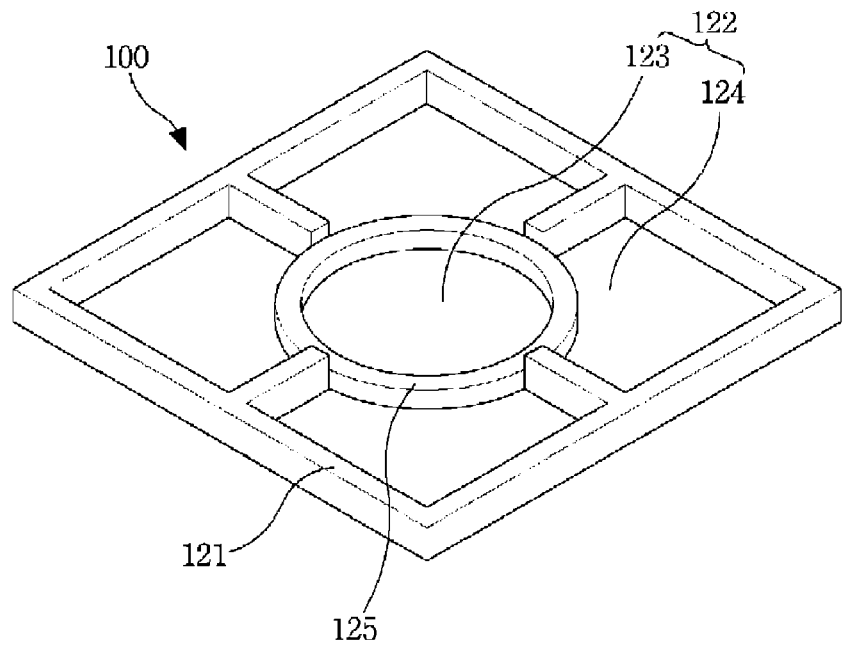
FIG. 2 is a perspective view of a frame illustrated in FIG. 1.

Meanwhile, as illustrated in FIG. 2, the frame 120 may further include a partition wall 125. The partition wall 125 partitions the receiving hole 122 into a central hole 123 and a plurality of edge holes 124 disposed around the central hole 123. Here, an upper surface of the partition wall 125 in a direction of the membrane 110 is formed on the same level as an upper surface of the border 121, so that the partition wall 125 can be bonded to the membrane 110.

In addition, the height of the partition wall 125 is lower than the height of the border 121 of the frame 120 so that the partition wall 125 is spaced from the substrate 130. Accordingly, the actuator 140 may enable the optical fluid 101 in the frame 120 to readily move between the central hole 123 and the edge holes 124.

The fluid lens 102 is formed in a region corresponding to the central hole 123. Further, the actuators 140 are installed on the outside of the membrane 110 to respectively correspond to the edge holes 124. The actuators 140 may concavely bend regions corresponding to the edge holes 124 on the outside of the membrane 110 to move the optical fluid in the edge holes 124 towards the central hole 123.

Alternatively, the actuators 140 may convexly bend regions corresponding to the edge holes 124 on the outside of the fluid lens 102 to move the optical fluid in the central hole 123 towards the edge holes 124.

As a result, the region corresponding to the central hole 123 may be formed in a convex, concave or flat shape. Therefore, the refractive power produced by a change in curvature of the fluid lens 102 may vary within a range of negative and positive values.

The actuator 140 may operate at low power and high speed. A polymer actuator, a piezoelectric actuator, etc. may be used as the actuator 140.

The polymer actuator refers to an actuator that generates displacement by means of expansion and contraction of a polymer caused by an electric field. Here, an electro-active polymer, an ionic polymer, etc. may be used as the polymer.

The piezoelectric actuator generates displacement using expansion and contraction of a piezoelectric device caused by the inverse piezoelectric effect.

Here, the polymer or piezoelectric actuator may be formed to have various structures as long as the outer surface of the membrane 110 can be repeatedly changed between concave and convex forms.

For example, the polymer actuator may have a structure in which two stacked structures are formed by stacking electrode layers on front and rear surfaces of a polymer layer, respectively, and the stacked structures are bonded to each other with a deformation-resistant layer interposed therebetween. In this case, a voltage may be selectively applied to the stacked structures such that the polymer actuator changes repeatedly between concave and convex forms.

The piezoelectric actuator may have a structure in which two stacked structures are formed by stacking electrode layers on front and rear surfaces of a piezoelectric device, respectively, and the stacked structures are bonded to each other with a deformation-resistant layer interposed therebetween. In this case, a voltage may be selectively applied to the stacked structures such that the piezoelectric actuator changes repeatedly between concave and convex forms.

Meanwhile, the actuators 140 may be installed such that the optical fluid 101 uniformly flow into the center of the central hole 123, and uniformly flow out the center of the central hole 123. Further, the edge holes 124 may be formed in the same shape.

Operation of the micro-shutter device having the above constitution according to an exemplary embodiment will be described below with reference to FIGS. 3 to 5. Here, FIGS. 3 to 5 are cross-sectional views illustrating operations of the micro-shutter device in an off-stage, an on-stage and a gray-stage, respectively.

Figure 3:
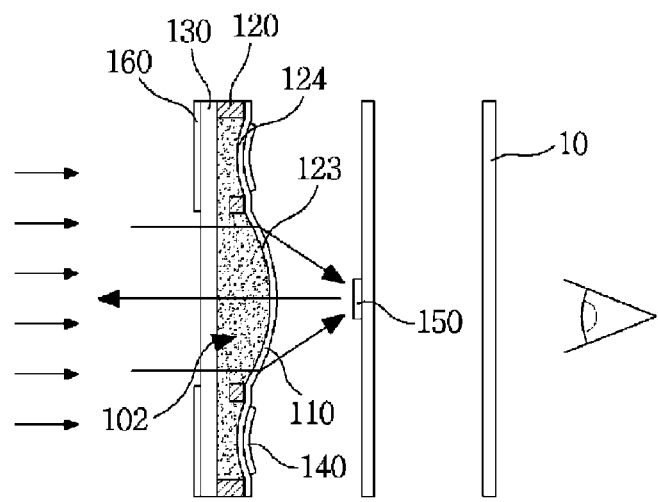
FIGS. 3 to 5 are cross-sectional views illustrating operations of the micro-shutter device of FIG. 1 in an off-stage, an on-stage and a gray-stage, respectively.

According to FIG. 3, the actuator 140 concavely changes the regions corresponding to the edge holes 124 on the outside of the membrane 110 as much as a set maximum displacement. Then, a volume of the optical fluid in the edge holes 124 corresponding to the volume through which the holes 124 are concavely bent flow into the central hole 123 so that a region corresponding to the central hole 123 becomes convex.

As a result, the refractive power produced by a change in curvature of the fluid lens 102 formed to correspond to the central hole 123 becomes a positive maximum value. Under these circumstances, light passing through the substrate 130 and incident on the fluid lens 102 is focused by the fluid lens 102 and entirely reflected by the reflector 150. Accordingly, the darkest image may be displayed on the screen for the user.

Figure 4:
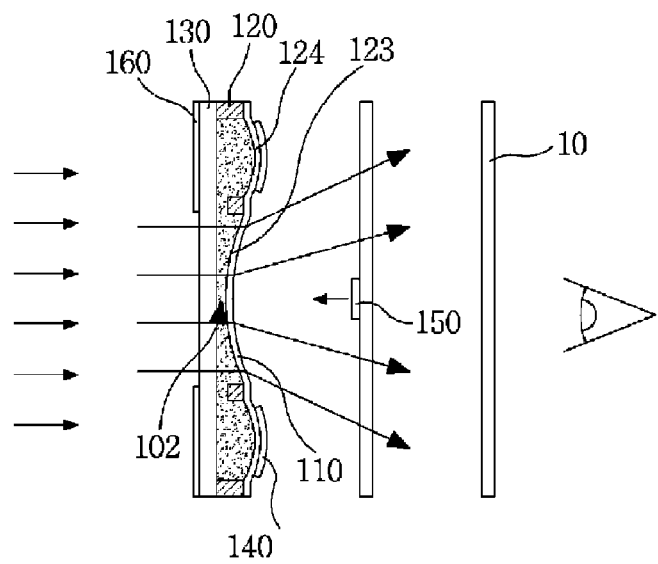
Figure 5:
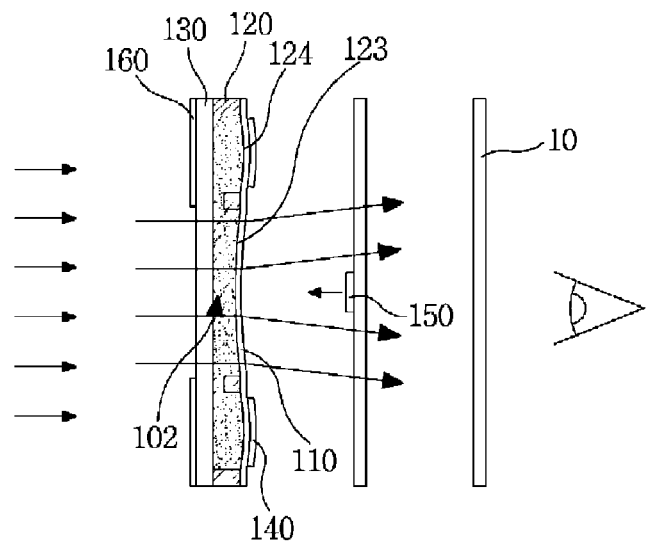

According to FIG. 4, the actuator 140 convexly changes the regions corresponding to the edge holes 124 on the outside of the membrane 110 as much as a set maximum displacement. Then, a volume of the optical fluid in the central hole 123 corresponding to the volume through which the holes 124 are convexly bent flow into the edge holes 124 so that the region corresponding to the central hole 123 becomes concave.

As a result, the refractive power produced by a change in curvature of the fluid lens 102 formed to correspond to the central hole 123 becomes a negative minimum value. Under these circumstances, light passing through the center of the fluid lens, among light passing through the substrate 130 and incident on the fluid lens 102, is reflected by the reflector 150, and most of the reflected light is dispersed by the fluid lens 102. Afterwards, the dispersed light passes through surrounding regions of the reflector 150. Accordingly, the brightest image is displayed on the screen 10 for the user.

According to FIG. 5, the actuator 140 flatly changes the regions corresponding to the edge holes 124 on the outside of the membrane 110 so that the regions corresponding to the edge holes 124 are at least substantially flat. Then, a surface of the optical fluid contained in the edge holes 124 becomes almost the same level as a surface of the optical fluid in the central hole 123, so that the region corresponding to the central hole 123 becomes flat.

As a result, the refractive power produced by a change in curvature of the fluid lens 102 formed to correspond to the central hole 123 is about zero. Under these circumstances, light passing through the substrate 130 and incident on the fluid lens 102 passes through the fluid lens 102, and about half of the light is reflected by the reflector 150 while the other of the light is dispersed to pass through surrounding regions of the reflector 150. Accordingly, a gray image with intermediate brightness may be displayed on the screen for the user.

As shown in the above exemplary examples, the refractive power produced by a change in curvature of the fluid lens 102 may vary between a positive maximum value and a negative minimum value, depending on direction and degree of deformation of the regions corresponding to the edge holes 124 caused by the actuator 140. Therefore, brightness of various levels may be displayed on the screen 10. When the micro-shutter device 100 is included in each unit pixel, and red, green and blue color filters are formed between the reflector 150 and the screen 10 or on the outer surface of the substrate 130 to correspond the unit pixels, a color image may be displayed.

As described above, in the micro-shutter device 100, light may be transmitted or blocked by the fluid lens 102, the actuator 140 and the reflector 150, and thus optical loss may be reduced compared to transmission/blocking of light using liquid crystal or a polarizing film. Therefore, optical efficiency may be increased by tens of percent.

A method of manufacturing a micro-shutter device 100 according to an exemplary embodiment will be described below with reference to FIGS. 6 to 11.

Figure 6:
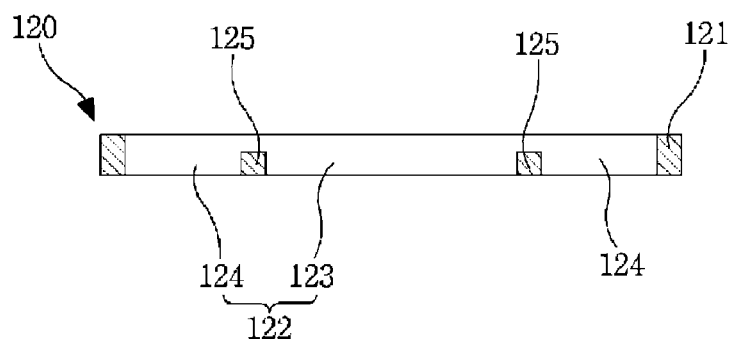
FIGS. 6 to 11 are cross-sectional views illustrating a method of manufacturing a micro-shutter device according to an exemplary embodiment.

First, as illustrated in FIG. 6, a frame 120 is prepared. Here, a receiving hole 122 which receives an optical fluid 101 is formed in the center of the frame 120. When an opening of a unit pixel included in a display device is rectangular, the frame 120 may be formed in the shape of a rectangle.

Further, in the process of forming the frame 120, a partition wall 125 that partitions the receiving hole 122 into a central hole 123 and a plurality of edge holes 124 disposed around the central hole 123 may be formed. Here, an upper surface of the partition wall 125 in a direction in which the frame 120 is to be bonded to a membrane 110 may be formed on the same level as the upper surface of a border 121 of the frame 120, and the upper surface of the partition wall 125 in a direction in which the frame 120 is to be bonded to the substrate 130 may be lower than the upper surface of the border 121 of the frame 120. In addition, the height of the partition wall 125 is lower than the height of the border 121 of the frame 120 so that the partition wall 125 is spaced from the substrate 130. This is to enable the optical fluid 101 in the frame 120 to readily move between the central hole 123 and the edge holes 124.

Figure 7:
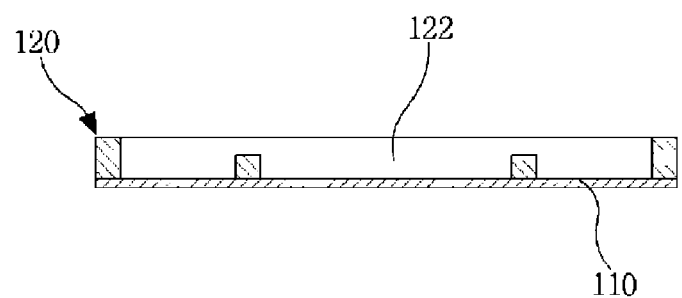

Afterwards, as illustrated in FIG. 7, the membrane 110 is bonded to a surface of the side on which the height of the partition wall 125 is the same as the height of the border 121 in the frame 120. Here, both the membrane 110 and the substrate 130 are formed large enough to encapsulate the optical fluid 101 in the frame 120. The membrane 110 may be formed of a flexible and transparent material, such as poly dimethyl siloxane (PDMS).

Figure 8:
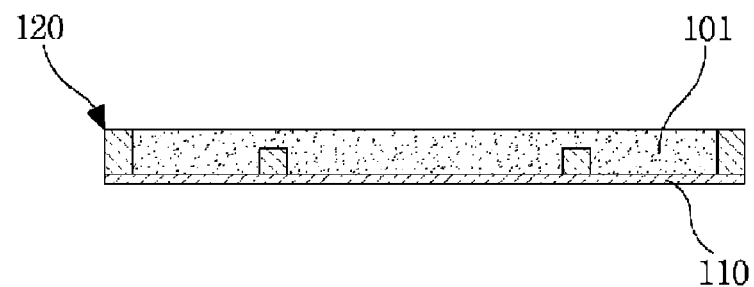

Next, as illustrated in FIG. 8, the optical fluid 101 is received in the receiving hole 122 of the frame 120. At this time, while the membrane 110 is disposed below the frame 120, the optical fluid 101 may be received in the central hole 123 and the edge holes 124 of the frame 120 by dispensing the fluid into the holes. The optical fluid 101 may be a material having a predetermined refractive index and viscosity, such as silicon.

Figure 9:
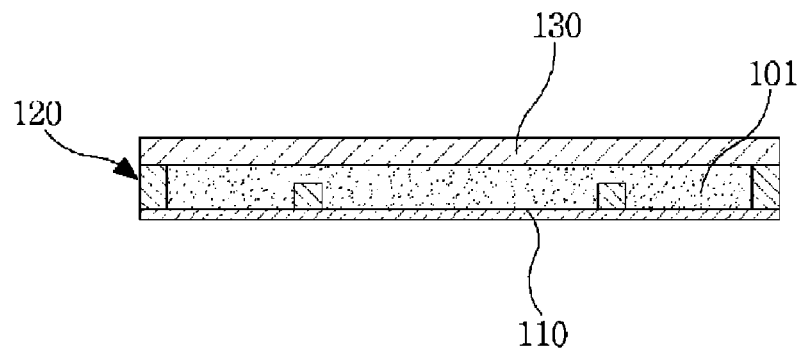

Subsequently, as illustrated in FIG. 9, a transparent substrate 130 is bonded to a surface of a side opposite to the side to which the membrane 110 is bonded in the frame 120, i.e., to a surface of the side on which the partition wall 125 has a lower height than the border 121. Here, both the substrate 130 and the membrane 110 are bonded to encapsulate the optical fluid 101 in the frame 120.

At this time, after an adhesive is coated on the border 121 of the frame 120, the substrate 130 is mounted on the frame 120, and UV curing is performed on the adhesive so that the substrate 130 is bonded to the frame 120.

Figure 10:
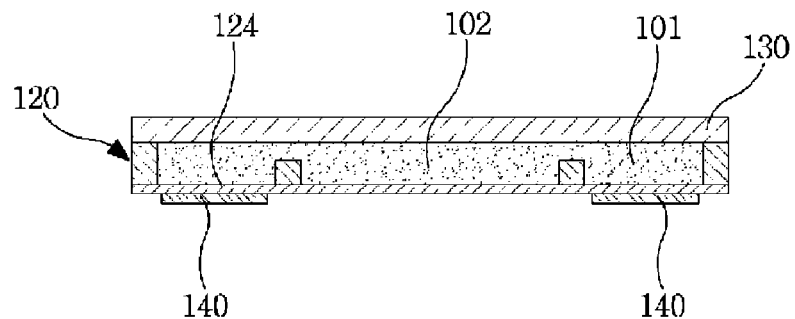

Afterwards, as illustrated in FIG. 10, actuators 140 are attached to an outer surface of the membrane 110. The actuators 140 are attached to the periphery of the fluid lens 102 formed in a center portion of the receiving hole 122. Here, when the fluid lens 102 is formed in the central hole 123, the actuators 140 are attached to the outside of the membrane 110 to respectively correspond to the edge holes 124. Here, the actuators 140 are installed such that the regions corresponding to the edge holes 124 can be repeatedly changed between concave and convex forms.

When the actuator 140 is formed of a flexible material together with the frame 120 and the substrate 130, the micro-shutter device 100 may be applicable to a flexible display device.

Figure 11:
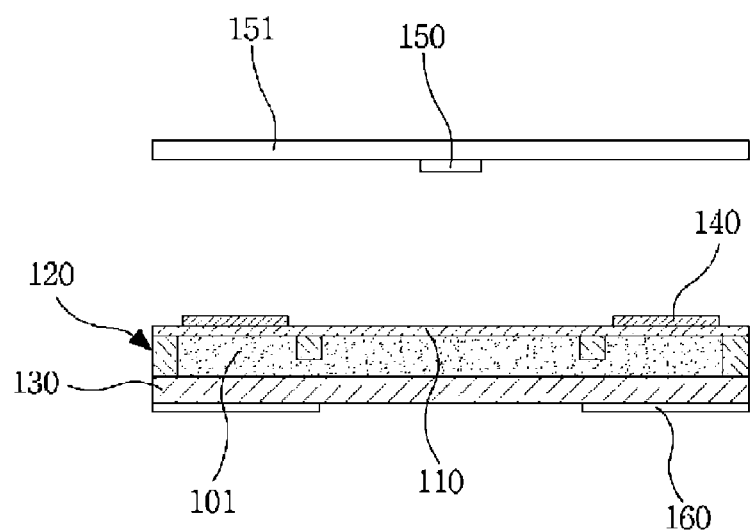

Next, as illustrated in FIG. 11, a reflector 150 is installed on the outside of the membrane 110. Here, the reflector 150 is installed to be spaced apart from the membrane 110 and to correspond the fluid lens 102. Here, when refractive power produced by a change in curvature of the fluid lens 102 is set to a positive maximum value, the reflector 150 is disposed to reflect all light that is focused by passing through the fluid lens 102. Furthermore, when the refractive power produced by a change in curvature of the fluid lens 102 is set to a negative minimum value, the reflector 150 is formed large enough to enable light passing through the fluid lens 102 to be dispersed and pass through surrounding regions. The reflector 150 may be formed on a transparent plate 151.

Meanwhile, light shielding units 160 may be formed on an outer surface of the substrate 130 to correspond to the periphery of the fluid lens 102. Here, the light shielding units 160 may be formed of an opaque material that cannot transmit light, and may be formed to cover a region other than the region corresponding to the fluid lens 102. Further, since bonding of the actuators 140 may be performed between bonding the membrane 110 to the frame 120 and bonding the substrate 130 to the frame 120, the exemplary embodiments of the present invention are not limited to the above-described sequence of fabrication steps.

It will be apparent to those skilled in the art that various modifications and variations can be made in the present invention without departing from the spirit or scope of the invention. Thus, it is intended that the exemplary embodiments of the present invention cover the modifications and variations of exemplary embodiments of the invention provided they come within the scope of the appended claims and their equivalents.

What is claimed is:

1. A micro-shutter device, comprising:
    a membrane;
    a frame bonded to the membrane and comprising a receiving hole in a center portion, the receiving hole comprising a central hole and a plurality of edge holes disposed around the central hole;
    a transparent substrate bonded to the frame to encapsulate an optical fluid in the receiving hole;
    an actuator configured to bend regions corresponding to the plurality of edge holes on an outside of the membrane, so as to vary refractive power by bending of a periphery of the fluid lens to change a curvature of a fluid lens formed in the receiving hole; and
    a reflector spaced apart from the membrane and so configured such that light intensity is adjusted depending on the refractive power produced by changing the curvature of the fluid lens, and disposed to be in optical communication with the fluid lens.

2. The device of claim 1, comprising a plurality of walls which partition the receiving hole into the central hole and the plurality of edge holes disposed around the central hole, wherein the height of one of the walls is lower than a height of a border of the frame so that the one said wall is spaced from the substrate.

3. The device of claim 2, wherein the actuator is configured to vary the refractive power produced by changing the curvature of the fluid lens within a range of refractive power produced by a negative change in curvature and refractive power produced by a positive change in curvature.

4. The device of claim 3, wherein the actuator is a polymer actuator.

5. The device of claim 3, wherein the actuator is a piezoelectric actuator.

6. The device of claim 1, wherein the substrate, the frame and the actuator are formed of a flexible material.

7. The device of claim 1, wherein the substrate is configured to receive collimated light incident from an outside of the substrate.

8. The device of claim 7, further comprising a light shielding unit disposed on the outside of the substrate to correspond to the periphery of the fluid lens.

9. A method of manufacturing a micro-shutter device, comprising:
    preparing a frame having a receiving hole formed in a center of the frame, the receiving hole comprising a central hole and a plurality of edge holes disposed around the central hole;
    bonding a membrane to one surface of the frame;
    receiving an optical fluid in the receiving hole of the frame;
    bonding a transparent substrate to another surface of the frame to encapsulate the optical fluid in the receiving hole of the frame;
    attaching actuators that are configured to bend regions corresponding to the plurality of edge holes on an outside of the membrane, so as to vary refractive power by changing a curvature of a fluid lens from a center portion of the receiving hole to a periphery of the fluid lens; and
    installing a reflector spaced apart from the membrane and in optical communication with the fluid lens, wherein the reflector is configured such that light intensity is adjusted depending on the refractive power produced by changing the curvature of the fluid lens.

10. The method of claim 9, wherein the preparing of the device comprises forming a plurality of walls to partition the receiving hole in the frame into the central hole and the plurality of edge holes disposed around the central hole, wherein the height one of the walls is lower than a height of a border of the frame so that the one said wall is spaced from the substrate.

11. The method of claim 9, wherein the substrate, the frame and the actuators are formed of a flexible material.

12. The method of claim 9, further comprising forming a light shielding unit on an outer surface of the substrate to correspond to the periphery of the fluid lens.

* * * * *